(No Model.)
M. E. SCHERER.
FLOOD GATE.
No. 326,922. Patented Sept. 22, 1885.
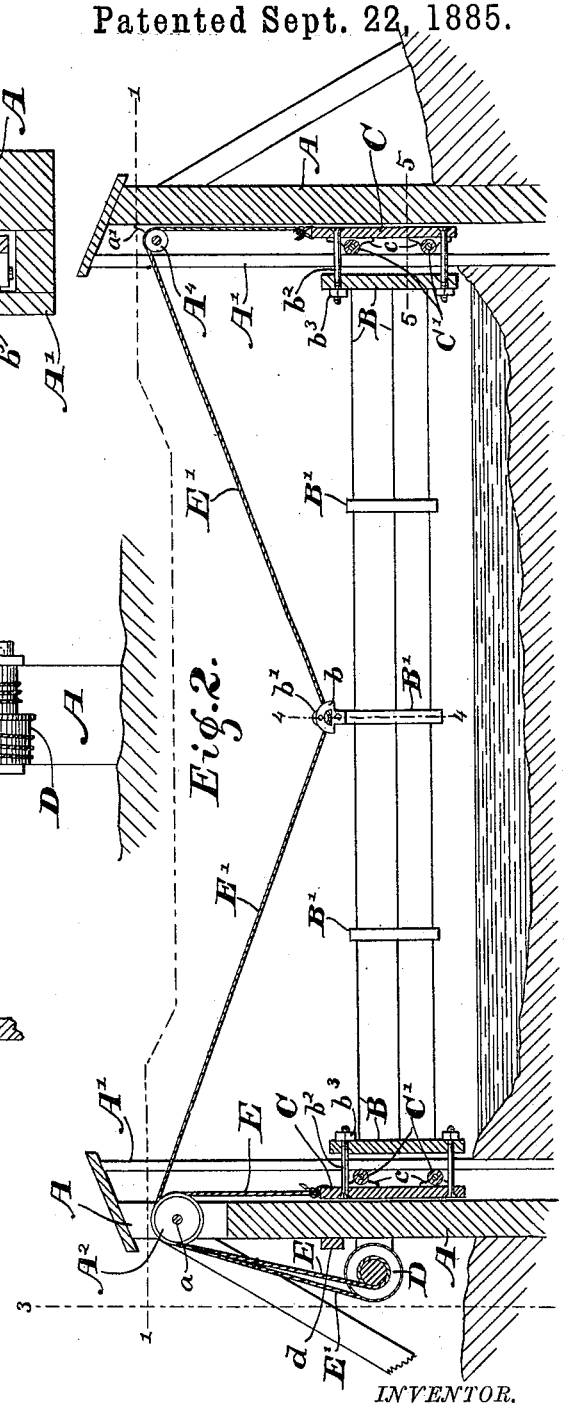
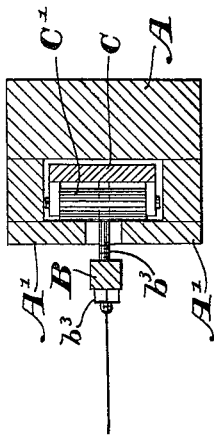
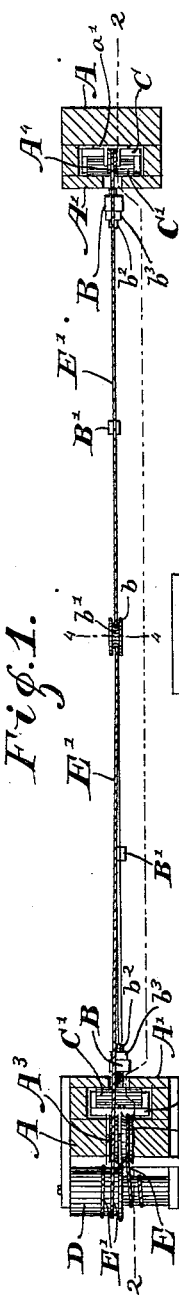
WITNESSES.
Chas. N. Leonard,
E. W. Bradford,
INVENTOR.
Matthew E. Scherer,
PER
C. Bradford,
ATTORNEY.

UNITED STATES PATENT OFFICE.

MATTHEW E. SCHERER, OF ARCADIA, INDIANA.

FLOOD-GATE.

SPECIFICATION forming part of Letters Patent No. 326,922, dated September 22, 1885.

Application filed March 21, 1885. (No model.)

*To all whom it may concern:*

Be it known that I, MATTHEW E. SCHERER, of the town of Arcadia, county of Hamilton, and State of Indiana, have invented certain new and useful Improvements in Flood-Gates, of which the following is a specification.

My said invention consists in an improved construction of flood-gates, whereby a convenient and efficient gate is provided, as will be hereinafter more particularly described.

Referring to the accompanying drawings, which are made a part hereof, and on which similar letters of reference indicate similar parts, Figure 1 is a top or plan view of my improved gate; Fig. 2, a longitudinal section through the same on the dotted line 2 2 in Fig. 1; Fig. 3, an end elevation looking to the right from the dotted line 3 3 in Fig. 2; Fig. 4, a vertical section through the middle of the gate on the dotted line 4 4 in Fig. 2, and Fig. 5 a cross-section through the post and end of gate on the dotted line 5 5 in same figure.

In said drawings, the portions marked A represent the end posts of the gate; B, said gate; C, sliding pieces mounted in said posts; D, a differential spool mounted on one of the end posts; E, a short cord attached to said spool at one end and to the nearest end of the gate at the other, and E' a long cord attached to said pulley at one end and to the opposite end of the gate at the other, as will be presently more fully described.

The end posts, A, are made hollow, and are mounted on suitable bases or inserted in the ground. The front piece, A', is formed in two parts, a vertical way or slot being left between them to permit the vertical adjustment of the gate. The post which has the spool D mounted thereon is cut away at the top of its rear part, and has a shaft, $a$, arranged therein, on which the sheaves $A^2$ $A^3$ for the cords E E' are mounted. A sheave, $A^4$, is mounted on the back side of the interior of the other post in the housing $a'$, over which the end of the cord passes, which is attached to the sliding piece in this post.

The gate B is or may be of any desired construction, the one shown being composed of the usual end pieces having wires stretched between them, and transverse stay-pieces B' located at suitable intervals throughout the length of the gate, to which said wires are secured. One of these stay-pieces is located midway of the gate, and has a housing, $b$, secured to its top end in which the sheave $b'$ is mounted. The gate is of course made of the length required to span the stream over which it is to be placed, and the posts are so located that it will readily slide up and down between their inside faces. The end pieces of the gate are adjustably connected to the sliding pieces C by the bolts $b^2$, which pass through said sliding pieces out through the slots in the inner faces of the posts and through the end pieces of the gate. The outer ends of these bolts are screw-threaded and provided with nuts $b^3$, whereby the gate when composed of wire or flexible material can be drawn out straight and taut.

The sliding pieces C are any suitable pieces of timber, or may be frames, if preferred, mounted in the posts A, and have anti-friction rollers C', mounted in bearings on their front faces. Said anti-friction rollers bear against the inner surface of the front side of the post, as shown, when drawn forward by the bolts $b^2$, which connect them to the ends of the gate, as before described.

The differential spool D is mounted on the back side of one of the posts A in suitable bearings, and is provided with a crank, D', on one end for operating the same. The large part of said spool has the long cord E' attached thereto, which passes under the sheave $b'$ at the center of the gate, thereby necessitating a faster winding in order to raise both the central portion and the other end of the gate, to which it is also attached, than the cord E, which is attached to the small part and passes directly to its end of the gate. Said parts are therefore so regulated in size that when said spool is turned the ropes will be wound up and unwound, so as to raise and lower both ends and the middle of the gate equally. A detent, $d$, is pivoted at one end to the post just above the spool on the pivot $d'$, and is adapted to turn down in front of the crank D', and thus hold said crank and spool from turning back.

The cord E is attached to the small part of the spool D at one end, and passes up over the sheave $A^2$ in the top of the post and down to the top end of the sliding piece C, to which it is attached.

The cord E' is attached to the large part of the spool D, passes up over the sheave $A^3$, along under the sheave $b'$ on the top end of the middle stay-piece, B', then up over the sheave $A^4$ in the top of the post on the opposite side of the stream, and down to the top of the sliding piece C therein, to which it is attached. Said cord is thus adapted to operate to raise and lower the gate from two points—one end (the sliding pieces and ends of the gate being rigidly connected) and the middle—which, with the rope E attached to the other end, forms three connections from which the gate is suspended, and thus a more steady and efficiently operating gate is provided, especially in the case of long gates, as will be readily understood.

My gate is operated by simply turning the spool by means of its crank. When it is desired to raise the gate up out of the way of a high water, the spool is turned in the direction to wind up the cords E and E', which operate to lift the gate from both ends and the middle, as before described. When at the desired elevation, the detent $d$ is turned down in front of the crank, which is thus prevented from turning back, and the gate is thus held in position. When it is desired to lower the gate, said detent is turned up out of the way and the spool turned so as to unwind the cords and allow the gate to fall to the desired position, where it is secured by the detent, as before.

I am aware that flood-gates have been constructed to be operated by ropes and a spool, said ropes being attached to the ends of the gate at one end and to said spool at the other; but I am not aware that the construction herein shown and claimed has ever been made.

Having thus fully described my said invention, what I claim as new, and desire to secure by Letters Patent, is—

1. The combination, in a flood-gate, of hollow end posts having slots in their front sides, a gate mounted between them, sliding pieces mounted in said hollow posts and secured to the ends of said gate by bolts passing out through said slots, a differential spool mounted on the rear side of one of said posts, and cords attached to said spool, passing over sheaves at the top of the posts and at the middle of the gate, and attached to said sliding pieces, substantially as described and for the purposes specified.

2. The combination, in a flood-gate, of end posts, a gate mounted between them, a differential spool mounted on one of said posts, a cord attached to the small part of said spool and passing up over a sheave in the top of the post and attached to the nearest end of the gate, and another cord attached to the large part of said spool and passing up over a sheave in the top of the post, then along under a sheave on the top of the middle portion of the gate, and from there up over a sheave in the top of the other post, then down and attached to the end of the gate farthest from said spool, substantially as described and for the purposes specified.

3. In a flood-gate, the combination of the hollow posts A, having slots in their front sides, the gate B, having end pieces, and a midway stay-piece, B', having a sheave attached thereto, the sliding pieces C, mounted in the posts and provided with anti-friction rollers C' on their front faces, said sliding pieces and the ends of said gate being secured together by the bolts $b^2$, the differential spool D, mounted on the rear side of one of said posts and provided with a crank, the cord E, attached at one end to the small part of said spool and passing up over the sheave $A^2$ in the top of the post and attached to the sliding piece C at the other end, the cord E', attached at one end to the large part of said spool, passing up over the sheave $A^3$ along under the sheave $b'$ on the gate, over the sheave $A^4$ in the top of the other post, and attached to the sliding piece C in said post, and the detent $d$, for holding the mechanism in position, all substantially as set forth.

In witness whereof I have hereunto set my hand and seal at Arcadia, Indiana, this 16th day of March, A. D. 1885.

MATTHEW E. SCHERER. [L. S.]

Witnesses:
 BENJ. NAGLE,
 J. F. TUDOR.